E. I. DODDS.
STAY BOLT FOR BOILERS.
APPLICATION FILED NOV. 30, 1914.
1,216,551.
Patented Feb. 20, 1917.
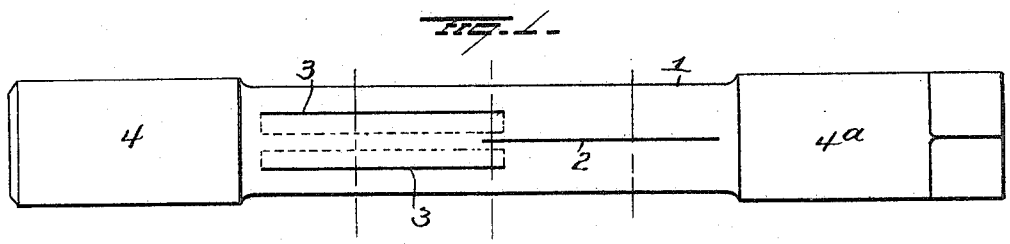
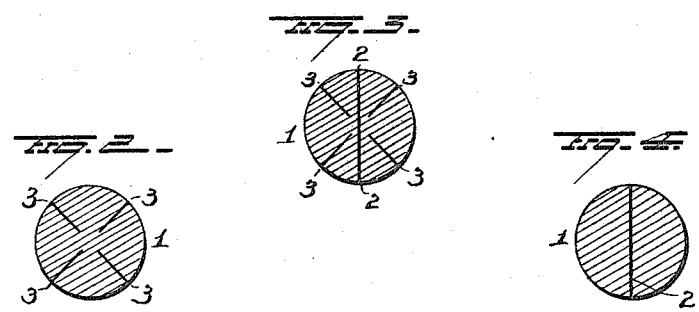
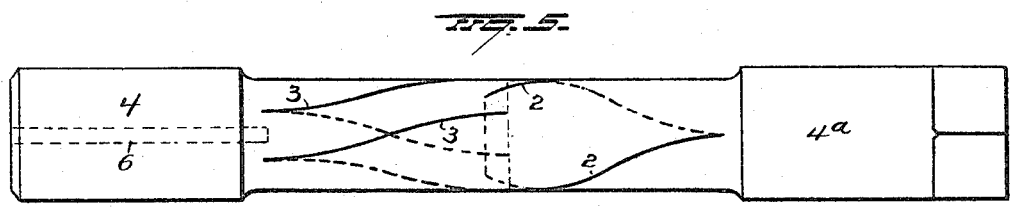
WITNESSES
INVENTOR
E. I. Dodds
Attorney

UNITED STATES PATENT OFFICE.

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT FOR BOILERS.

1,216,551. Specification of Letters Patent. Patented Feb. 20, 1917.

Application filed November 30, 1914. Serial No. 874,823.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolts for Boilers; and I do hereby declare the following to be a full, clear, and exact description of the invention, such as will enable others skilled in the art to which it appertains to make and use the same.

My invention relates to improvements in stay bolts for boilers, the object being to provide a bolt that will have greater flexibility adjacent one head of the bolt than at any other part, so as to localize or confine the torsional or twisting movement to such flexible portion. With this end in view my invention consists in the details of construction as will be more fully described and pointed out in the claims.

In the accompanying drawings, Figure 1 is a view in elevation of the bolt blank after it has been slotted but before it is twisted; Figs. 2, 3 and 4 are views in section of the same, the views being taken respectively on the dotted lines shown in Fig. 1, and Fig. 5 is a view of the bolt after the shank has been twisted.

In the manufacture of this bolt, a bar of stay bolt metal, perferably cylindrical, is subjected to an upsetting heat and is swaged between dies having openings therein for the entrance of piercing tools or cutters for piercing or cutting slots in the shank 1 of the bolt. After the slots 2 and 3 have been cut, the shank 1 is reduced in diameter as in Fig. 1, and the heads 4 and 4ª are formed and threaded in the usual manner.

The shank 1 of the bolt is slotted approximately throughout its length, so that the entire shank will respond more readily to twisting or torsional strains than a solid shank, but in order to localize the movement of the shank I have provided the end thereof adjacent the outer head 4 with a series of slots 3. In the present instance I have shown four arranged in pairs diametrically opposite each other but stopping short of the center, the slots of one pair being at right angles to those of the other pair. These slots 3 extend from or near the juncture of the head 4 with shank 1, a distance sufficient to provide for the necessary flexibility of this portion of the shank, while the single slot 2 extends from the inner head 4ª of the bolt, to and preferably slightly beyond the inner edges of the slots 3, as shown in Fig. 1. This slot 2 extends all the way through the bolt shank 1, and of course renders this portion of the shank more flexible or yieldable to torsional or twisting strains, than a solid shank, while the plurality of slots adjacent the outer head divides the shank into a greater number of parts connected only at their inner ends, and renders this end of the shank more yielding or flexible to torsional or twisting strains than the other end.

After the blank thus described has been formed, the shank portion thereof is twisted about 180° as shown in Fig. 5, and the two heads threaded and the tell-tale 6 bored in the head 4.

In the event of a rupture of the bolt at or near the juncture of the shank and head 4, which is the point at which a break usually occurs, the steam or water can escape through the tell-tale and indicate the break.

While the exact sequence of the steps may not be essential, I prefer to heat the bar or blank to a mellow heat and shape it in dies or other suitable tools to produce an enlarged head at each end and if desired, also to reduce the diameter of the shank. The shank is then pierced from opposite sides after which the slots or impiercements are closed, the shank twisted between its ends and the bolt smoothed and straightened between dies.

A bolt thus constructed is sufficiently rigid to withstand all longitudinal strains either compressive or pulling, to which it may be subjected in ordinary usage, and all torsional or twisting strains to which it may be subjected in applying it to the sheets, but sufficiently flexible laterally to accommodate itself to the lateral twisting or torsional strains imparted to it by the unequal movements of the boiler sheets.

The slots above referred to are not formed by the removal of any of the metal but simply by cutting or piercing it, so that the capacity of the shank for endwise stresses is not weakened.

Having fully described my invention what I claim as new and desire to secure by Letters-Patent, is:—

1. As a new article of manufacture, a stay bolt, the shank of which is slotted all the way through adjacent one end, and provided with a plurality of slots extending part way through adjacent the other end.

2. As a new article of manufacture, a stay bolt consisting of a shank and two integral heads, the shank being slotted all the way through near the inner head and provided with a plurality of slots adjacent the outer head, the said slots at the two ends of the shank overlapping at the center.

3. As a new article of manufacture, a stay bolt consisting of a shank and two integral heads, the shank being slotted all the way through adjacent the inner head and provided with a plurality of slots extending part way through, adjacent the outer head.

4. As a new article of manufacture, a stay bolt consisting of a shank and two integral heads, the shank being slotted all the way through adjacent the inner head and provided with a plurality of slots part way through adjacent the outer head, all of said slots extending lengthwise the shank, and the latter being twisted.

In testimony whereof, I have signed this specification in the presence of two subscribing witnesses.

ETHAN I. DODDS.

Witnesses:
WM. CHARLES BINGHAM,
EDWIN SPENCER RYCE.

Copies of this patent may be obtained for five cents each, by addressing the "Commissioner of Patents, Washington, D. C."